United States Patent [19]

Vucic

[11] 4,047,659
[45] Sept. 13, 1977

[54] METHOD FOR REPLACING WORN TUBES IN A GAS HOOD

[75] Inventor: Drago M. Vucic, Lorain, Ohio

[73] Assignee: United States Steel Corporation, Pittsburgh, Pa.

[21] Appl. No.: 734,067

[22] Filed: Oct. 20, 1976

Related U.S. Application Data

[62] Division of Ser. No. 646,302, Jan. 2, 1976.

[51] Int. Cl.² ............................................ B23K 28/02
[52] U.S. Cl. .................................... 228/119; 228/170
[58] Field of Search ................ 228/119, 170, 183, 184

[56] References Cited

U.S. PATENT DOCUMENTS

| 3,514,839 | 6/1970 | Rodrigues | 228/184 X |
| 3,608,181 | 9/1971 | Popov | 228/170 |

FOREIGN PATENT DOCUMENTS

| 1,348,792 | 3/1974 | United Kingdom | 228/119 |

Primary Examiner—Al Lawrence Smith
Assistant Examiner—K. J. Ramsey
Attorney, Agent, or Firm—William A. Danchuk

[57] ABSTRACT

Method for the repair of water-filled cooling tubes of a gas hood for a basic oxygen process steelmaking furnace. The method provides for an increase in the efficiency with which repairs are made to the cooling tubes located substantially throughout the entire circumference and length of the gas hood.

11 Claims, 5 Drawing Figures

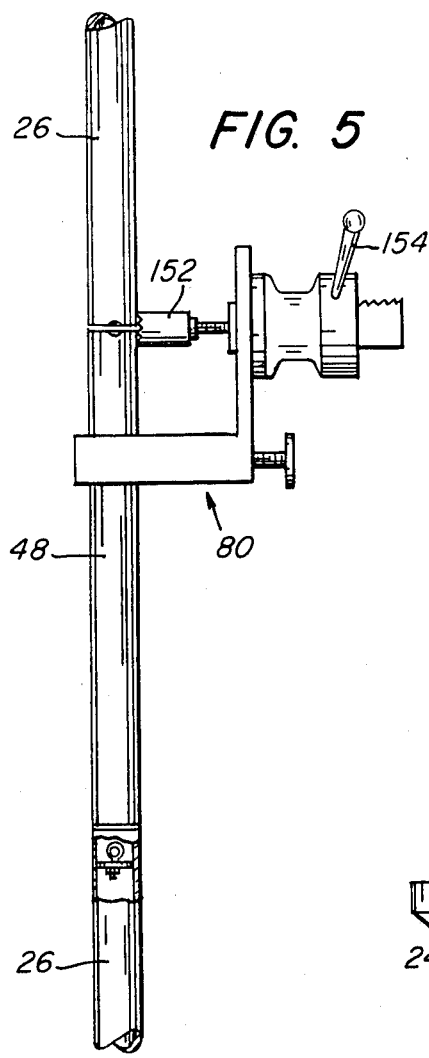
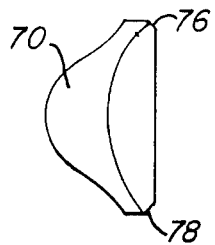
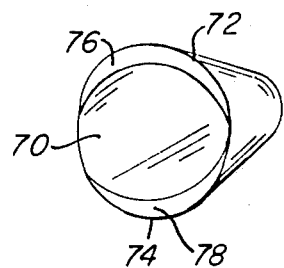
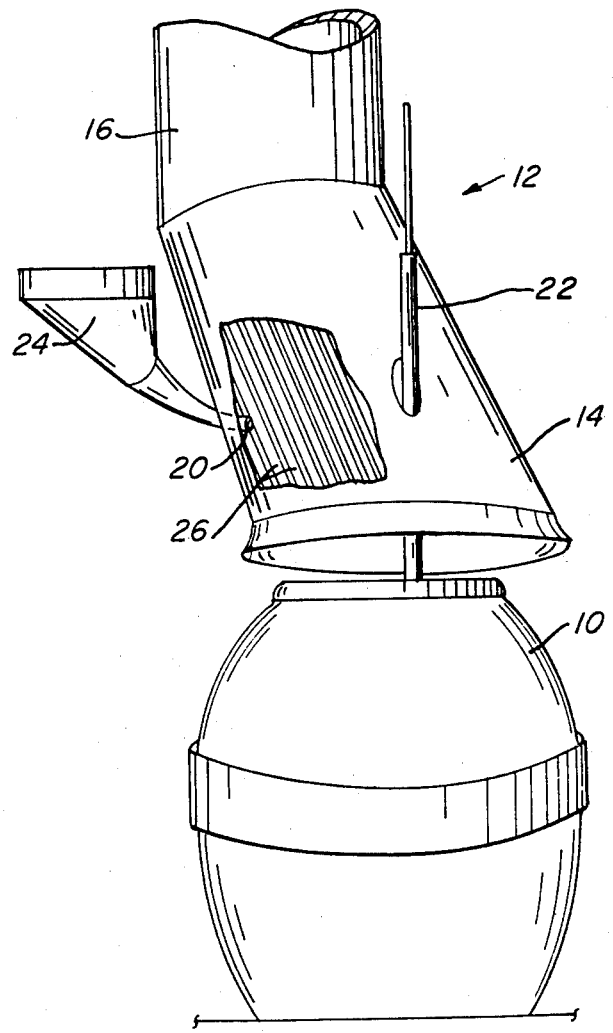

METHOD FOR REPLACING WORN TUBES IN A GAS HOOD

This is a division, of application Ser. No. 646,302, filed Jan. 2, 1976.

BACKGROUND OF THE INVENTION

The heat, dust and gases produced in basic oxygen process steelmaking furnaces require the use of hoods and stacks for containing and drawing them off prior to their cleaning and subsequent exhaust to the environment. Such gas hoods and stacks located above the furnace leading to the gas-cleaning and dustcollecting facilities are water-cooled in their entirety. Of membrane-type construction, they are cooled by water flowing in steel tubing spaced very close together. Such tubing is generally circular in cross-section and, due to the intense environment it is subjected to, corrodes, rusts and develops leaks after relatively short periods of use.

The cooling tubes in a basic oxygen process furnace gas hood are so numerous that they are constantly being repaired. Repair generally consists of cutting out the damaged or leaking section of tubing and welding in a new length of tube. While the repair of tubing is certainly efficacious, the efficiency and speed with which such repairs are made under present practices leaves much to be desired.

SUMMARY OF THE INVENTION

The present invention is addressed to a method for the efficient and speedy repair of the water-filled cooling tubes contained within a gas hood for a basic oxygen process steelmaking furnace.

The basis of the apparatus employed and therefore the method, is a self-aligning and centering clamp for use in combination with a circular hole cutting mechanism or drill. The clamping device permits the accurate locating of the drill on the tubing which is being repaired in a radial direction with respect to the circular cross-sectioned tube. The use of the clamping device permits the use of the circular drilling mechanism which obviates the need for cutting a square hole in the tube as was done previously. The prior method of repair involved not only the extra time for accurately cutting the square hole, but also the increased time involved in closing up the window later. In this manner the repair of damaged or leaking tubing may be accomplished herewith minimal effort, complexity and downtime.

It is therefore a primary object and feature of the present invention to provide an improved method for repairing the water-filled cooling tubes contained within the gas hood for a basic oxygen process steelmaking furnace.

It is a further object and feature of the present invention to provide a method employing an apparatus for use in conjunction with a hole drilling mechanism for temporarily securing and aligning the hole drilling mechanism relative to the circular cross-sectional tubing with which the apparatus and hole drilling mechanism is to be employed.

It is another object and feature of the present invention to provide an improved method of repairing water-filled cooling tubes contained within a gas hood for a basic oxygen process steelmaking furnace, the method providing for the drilling of accurately and conveniently located circular holes in the circular cross-sectioned cooling tubes.

Other objects and features will, in part, be obvious and will, in part, become apparent as the following description proceeds. The features of novelty which characterize the invention will be pointed out with particularity in the claims annexed to and forming part of the specification.

BRIEF DESCRIPTION OF THE DRAWINGS

The novel features that are considered characteristic of the invention are set forth with particularly in the appended claims. The invention itself, however, both as to its structure and its operation together with additional objects and advantages thereof will best be understood from the following description of the preferred embodiment of the invention when read in conjunction with the accompanying drawings wherein:

FIG. 1 is a perspective view of portions of a basic oxygen process steelmaking furnace and a gas hood employed in conjunction therewith with which the apparatus and method of the present invention in employed;

FIG. 5 is a side elevational view of the self-aligning and centering clamping device associated with the present invention in combination with a hole drilling mechanism, both of which are shown in their operative positions relative to a section of tubing to be repaired; and FIGS. 6a and 6b are a perspective view and a side view, respectively, of a typical closure device which is used in the repair of cooling tubes according to the method of the present invention.

DETAILED DESCRIPTION OF THE INVENTION

Figure 2:
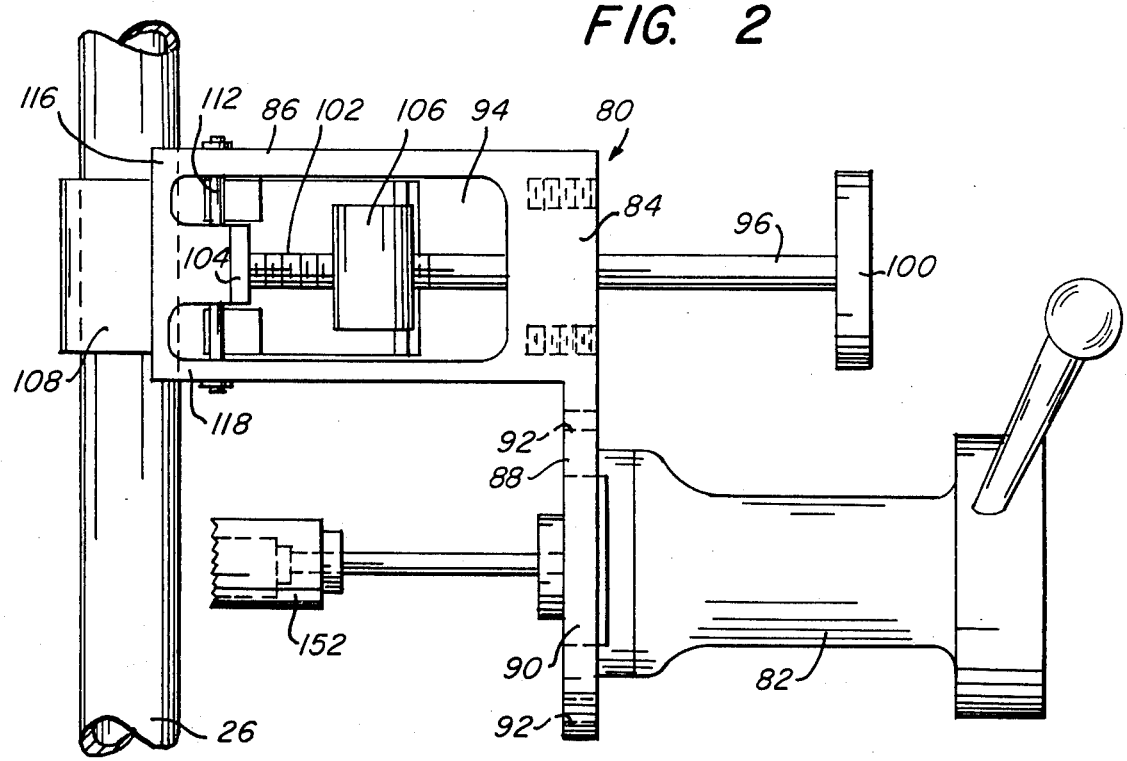
FIG. 2 is a side elevational view of the self-aligning and centering clamping device associated with the present invention in combination with a drilling mechanism with which it is employed.

Looking at FIG. 1, there are shown portions of a basic oxygen process furnace and a gas hood for use therewith. The basic oxygen process furnace 10, (hereinafter referred to as a "BOP" furnace), is commonly known in the steelmaking industry and will not be described here in further detail. Associated with the BOP furnace 10 and positioned above the same, is a gas exhaust assembly indicated generally at 12. The gas exhaust assembly 12 includes the various hoods and stacks above the furnace leading to the gas-cleaning and dust-collecting facilities located between the BOP furnace 10 and the atmosphere.

The gas exhaust assembly 12 generally includes a gas hood 14 positoned directly above the furnace 10 and ducting 16 leading to the gas-cleaning and dust-collecting facilities noted above. The gas hood 14 is configured having at least two small apertures 18 and 20 located therein. Aperture 18 permits the entry and exiting of an oxygen lance 22 which is used for introducing pure oxygen onto the molten metal contained within the furnace 10. The aperture 20, located in the side of the gas hood 14, permits the entry of specific additives to the basic molten metal from an additive hopper 24 located above the furnace 10. The various additives which may be introduced into the molten metal bath control, and add to the specific makeup of the steel, are well known in the steelmaking industry.

Due to the intense heat, gases and dust produced during the steelmaking process, it is necessary to contain the gases and dust before they may escape to the ambient atmosphere. A simple metal hood would be insufficient to contain the gases and because of its direct proximity to the intense heat generated within the furnace 10. Accordingly, the hood 14 and the connecting duct 16 is cooled by water flowing in 1½ inches steel tubing spaced about the total circumference and length of the hood 14 and ducting 16. A portion of this tubing is indicated at 26 through a cutaway portion of the hood 14. If it were not for the water constantly flowing through the tubing 26, both the hood and connected ducting would eventually melt.

The intense heat and the caustic nature of the gases and dust generated within the furnace 10 causes periodic leaking to portions of the tubing 26. It is incumbent for efficient operation of the cooling mechanism that these leaks be sealed or repaired. It is this type of tube repair with which the present apparatus and method according to the present invention is associated. It should be obvious, for economic reasons, that the hood 14 or the tubing 26 cannot be replaced in toto just because one area of tubing is damaged or leaking. Accordingly, repair procedures have been implemented in order to effect repairs to the tubing with a minimum amount of downtime. To date, these procedures have left much to be desired inasmuch as they are time consuming and, consequently, expensive.

Figure 4B:
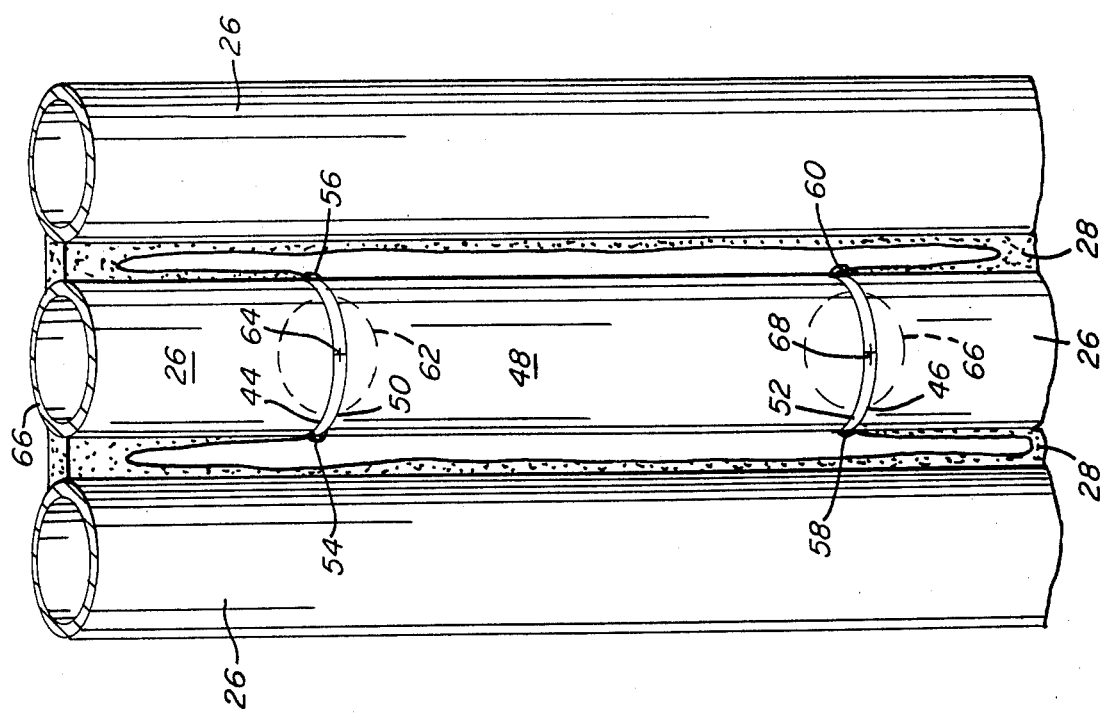
FIG. 4b is a perspective view of the tubing with which the apparatus and method of the present invention is employed.
Figure 4A:
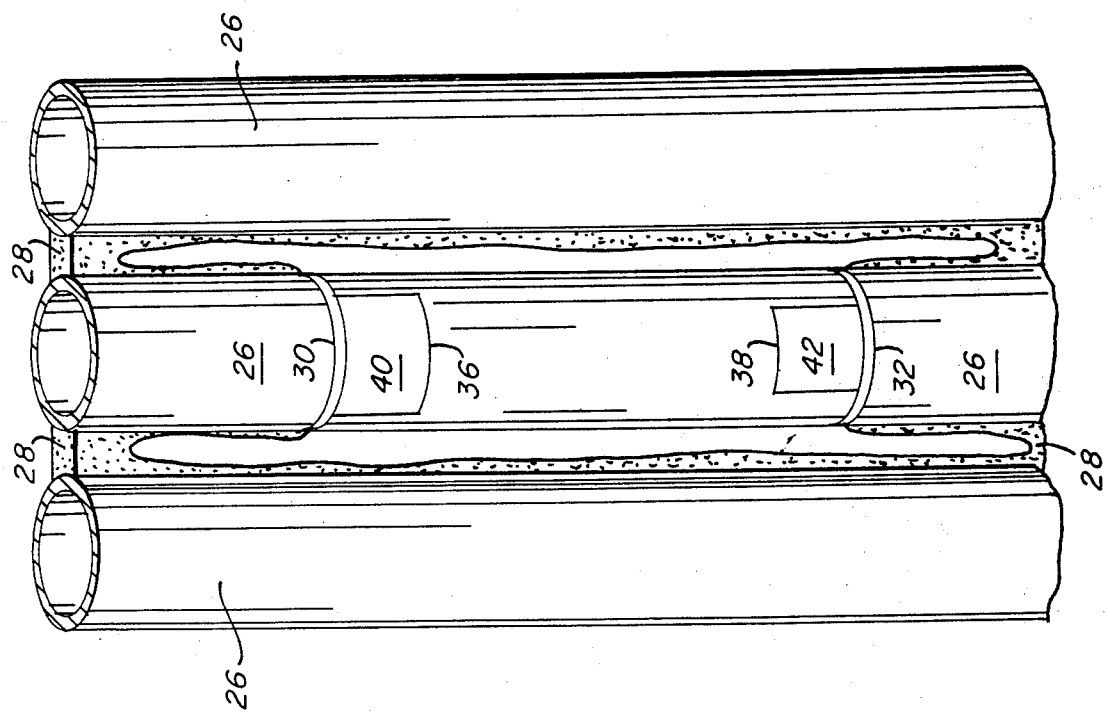
FIG. 4a is a perspective view of tubing being repaired prior to use of the present apparatus and method and is labeled prior art.

Procedures employed in the past to repair a leaking tube have been certainly more bothersome than they needed to be. For instance, FIG. 4a indicates the basis of the procedure used prior to the employment of the present method and apparatus. FIG. 4a shows a portion of three adjacent cooling tubes 26 connected together along their sides by metal webbing 28. For purposes of this description, it will be assumed that the middle portion of the middle tube has been found to have a leak and must be repaired. In order to effect the repairs of the tube, the webbing material 28 proximate the leaking tube must be removed by a torch. As shown in FIG. 4a, this has already been done. Next, the leaking tube is cut by use of a torch and the remaining ends 30 and 32 are squared off using a carbide rotary file (not shown). A substitute piece of tubing 34 is accurately sized to the space to be filled. Before the substitute piece of tubing 34 is inserted in the space, two rectangularly shaped windows 36 and 38 are cut into the top end and bottom end, respectively, of the substitute tubing 34 as indicated in FIG. 4a. The substitute tubing 34 is then inserted between ends 30 and 32 and is tack welded to hold the same in place. Next, a weld is made on the interior of the top and bottom joints located at end 30 and end 32, respectively. These welds are made through the windows 36 and 38. Once the top and bottom welds have been made, accurately shaped window covers 40 and 42 must be cut from equal size tubing and fit into the windows 36 and 38, respectively. It should be obvious that the cutting of square windows in circular tubing and the subsequent cutting of window covers in rectangular shapes is time consuming and requires accurate and demanding work. Applicant's experience in this regard has substantiated the fact that the majority of time used in the repair of cooling tubes is dedicated to the accurate square cutting of the windows and window covers. When the window covers have finally been fit into the windows, welding about their periphery is made and the tubing is ready to be joined to the adjacent tubes by webbing which is filled in through well-known welding procedures.

The major portion of the problem with the method just discussed is the process lug which the worker accurately fits the window covers into the windows. It has been suggested in this regard, for instance, that if the window covers could overlap the window cut into the tubing, no major problem would exist. However, such overlapping is not permitted within the confines of the hood and the stacks due to the fact that the heat and dust produced within the furnace 10 would have greater access to a patch or window cover which is not flush with the tubing it is associated with. As a result, the patch or window cover would be more easily attacked by these extremes and would require repair themselves in a relatively short period of time. It therefore becomes readily apparent that the cumbersome cutting out of rectangular holes in round tubing and the subsequent accurate fitting of window covers into those holes necessitates the use of too much time and manpower to a piece of machinery which demands a minimized downtime. Alternatively, the use of oversized window covers which may be used to cover smaller windows cut within the tubing (in order to allow interior access for welding purposes) is not practical under the operating conditions and circumstances present within the gas hood of a BOP vessel or furnace.

The present method and the apparatus used in that method were developed in order to simplify the above-noted repair procedure and alleviate the cumbersome and time consuming cutting and fitting of square holes and window covers within a circular cross section cooling tube. In this regard, reference should now be made to FIGS. 4b, 6a and 6b. Similarly, reference should be made to FIGS. 2, 3, and 5 with reference to the self-aligning and self-centering clamping device, according to the present invention. Looking to FIGS. 4b and 6a and b, the method according to the present invention will now be described.

The initial steps of the method of the present invention are, for the most part, similar to those described with reference to the prior repair procedure. Specifically, after the leaking or damaged tube has been identified, the webbing material 28 is removed from the sides of the portion of tube which will be substituted for. The damaged or leaking tube is then cut out of the array of adjacent tubes and the ends are squared up as previously described. The remaining steps according to the method of the present invention, however, differ from the procedure discussed above and will become apparent below.

After the damaged tube has been cut out from the tubing array and the remaining ends 44 and 46 of the tubing have been squared off, a new piece of tubing 48 is measured for insertion between the two previously mentioned ends. The new tubing, having an upper end 50 and a lower end 52 placed in frictional engagement with ends 44 and 46, respectively, is tact welded in place at points 54, 56, 58 and 60 as shown in FIG. 4b. The tact welds 54, 56, 58, and 60 are preferably located at the sides of the tube 48 for reasons which will become apparent below. The next step of the process involves the self-aligning and centering clamping device of the present invention which will be described in detail below. However, for purposes of description of the method of the present invention, it need only be recognized that such a clamping device is utilized in combination with a drilling device for cutting round holes.

The clamping device is attached to the tubing 48 such that a 1⅛ inches diameter hole 62 is drilled into the 1½ inches diameter tubing with the hole center 64 located directly on the intersection between end 50 of tubing 48 and end 44 of tubing 26 as indicated in FIG. 4b. A hole is then drilled into the joint of the two tubings and the forward progress of the drill is limited such that the drill does not engage the rear portion 66 of the tubing being drilled. It should be obvious at this point that the clamping device employed with the round hole drill must both secure the drill to the tubing and steady the drill relative to the tubing such that an accurate hole 62 will be drilled into the tubing.

After the first hole 62 has been drilled in the upper portion of the tubing a second hole 66 is drilled at the intersection of the ends 46 and 52 of the tubing 26 and 48, respectively. Hole 66 has a 1 ⅛ inches diameter and also has a center 68 located directly on the intersection between the two pieces of tubing. It should be noted in this regard that the clamping device must be inverted for this purpose due to the fact that a minimum amount of webbing material 28 is cut away below the splice line at end 46 and above the splice at end 44 of the tubing 26. It should also be noted that the order of drilling of holes 62 and 66 is of no consequence and the sequence just described may be easily reversed. After the two holes 62 and 66 have been drilled, the interior of the joints between ends 44 and 50 and between ends 46 and 52 are welded on their interior. A bevel is provided for this purpose on the interior of each of the ends 50 and 52 of the substitute tubing 48. The centrally located holes 62 and 66 contribute to the ease with which the new welds may be made joining the new tubing to the existing ends. A better weld may be made with this centrally located hole than with the windows which were cut below and above the portion to be welded in the priorly-described procedure.

After the two welds at each end of 50 and 52 of the new tubing have been made, appropriately sized and shaped plugs are fit into the openings and welded in place. In this regard, reference should now be made to FIGS. 6a and b, wherein there is shown an appropriately sized and shaped plug 70. The plug 70 is formed from an equally sized piece of tubing (1½ inches diameter) and has an outer diameter of 1⅛ inches such that it will accurately fit within the 1⅛ inches hole previously drilled within the tubing. The manner in which the plug 70 is formed is exactly the same as the process by which the holes 62 and 66 are formed within the tubing described with regard to FIG. 4b. However, the drill which is used to cut the plug 70 does not have a center tap drill due to the requirements of keeping the plug integral without a center hole.

For purposes of welding, either the periphery of the holes 62 and 66 are beveled, or the exterior edges of the plug 70 are beveled, or a combination of the two bevelings is used. Specifically, in the preferred embodiment of the invention both the exterior of the holes 66 and 62 are beveled and a portion of the plug 70 is beveled as indicated in FIG 6a. As shown therein both the top and bottom portion 72 and 74, respectively, are provided with bevels 76 and 78, respectively. Additionally, the two sides of the holes 66 and 62 are beveled in areas approximate to the splice line between the two sections of the tubing. As a result of this configuration, a bevel exists all the way around the periphery between the adjacent portions of the plug 70 and the holes 62 and 66 into which it is fit.

Subsequent to the welding of the plug 70 in place within the holes 62 and 66, the webbing material 28 is replaced so as to strengthen the tube and the repair process, once the clamping device and drill have been removed, is completed. The apparatus which is employed in the above-noted method of repair for cooling tubes will now be discussed. In this regard, reference should now be made to FIGS. 2, 3, and 5 wherein the apparatus per se and the apparatus in combination with a circular hole drill is shown.

Figure 3:
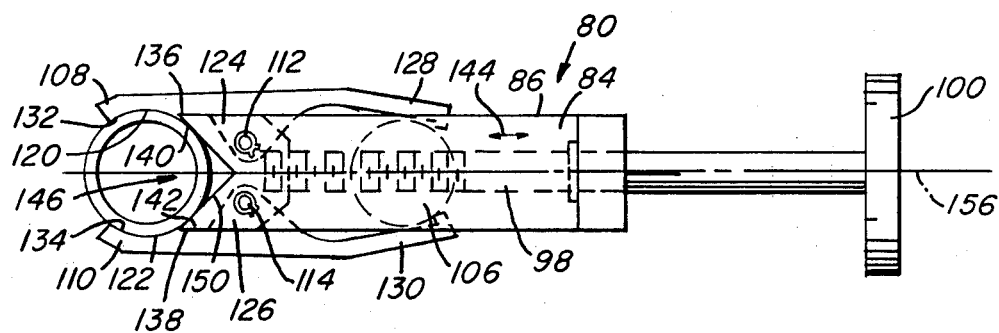
FIG. 3 is a plan view of the clamping device of FIG. 2.

The self-aligning and centering clamping device associated with the present invention is indicated generally in FIGS. 2 and 3 at 80. The self-aligning and clamping device 80 is operationally associated with a circular hole drill 82, the latter being supported in its operative position by the clamping device 80. The device 80 includes a generally "L" shaped housing 84, the housing having a clamp supporting portion 86, and a drill supporting section 88. The drill supporting section 88 of the housing 84 includes a major aperture 90 extending therethrough through which a portion of the drill 82 extends. Two smaller apertures as at 92 are provided within the drill supporting section 88 for mounting the drill 82 to the housing 84 through the drill support section 88. The clamp supporting section 86, of the housing 84, is configured at having a central opening 94, in which several of the components of the clamping device function. Extending through the rear portion of the housing 84 is an actuator mechanism 96. Actuator mechanism 96 generally includes a steel shaft portion 98, a dial portion 100, and a threaded portion 102, which terminates and is freely rotatable in a boss member 104, located approximately in front of the housing section 86. The steel shaft portion 98 of the actuator mechanism 96 passes through the rearward central area of the clamp supporting section 86 of the housing 84. Mounted on the threaded portion of the steel shaft 98 is a linear movable block member 106, which contains threads suitably sized to the threaded portion 102 of the steel rod 98, such that one may turn with respect to the other. The linearly movable block member 106 has a generally cylindrical shape as may be seen in FIG. 3, the purpose of which will become apparent below.

Pivotally mounted to the front area of the housing 86 are two arm members, 108 and 110. In FIG. 2, arm 110 has been removed, so as to show the internal detail of the clamping device. The two arms, 108 and 110, are pivotally mounted to the front portion of the housing 86, through appropriate pins 112 and 114, respectively. Pins 112 and 114 pass through both an upper and lower flange 116 and 118, respectively, of the housing 86, and also through a portion of the boss member 104 located proximate the center of the front portion of the housing 86. The arms 108 and 110 are configured having tube engaging portions 120 and 122, pivotally supporting flange portions 124 and 126, respectively, through which the pins 112 and 114 are passed, and arm limiting portions 128 and 130, respectively. The tube engaging portions 120 and 122 of the arms 108 and 110, respectively, are formed having concave cutaway portions 132 and 134, as shown in FIG. 3.

The inward movement of arms 108 and 110 of their tube engaging portions 120 and 122 is limited by the engagement of portions 136 and 138 contacting the outermost portions of the housing 86 at points 140 and 142, respectively. Similarly, the inward movement of portions 128 and 130 of the arms 108 and 110 is limited by contact of the two portions with the steel shaft portion 98 proximate the screw thread portion 102 of shaft 98.

The movement of the two arms 108 and 110 between their clamping positions, in which the tube engaging portions 120 and 122 of the two arms are moved towards each other, and their unclamped position, in which the two portions, 130 and 128 are moved toward each other, is controlled by rotation of the dial portion 100 of the actuating mechanism 96. Specifically, due to the relative size of the cylindrical block member 106, rotation of the dial 100 and shaft 98 causes a linear movement of the cylindrical block member 106 back and forth in the direction indicated by arrow 144. The cylindrical block portion 106, due to the fact that it may not fully rotate within the confines between the two portions 128 and 130 of the two arms 108 and 110, results in this linear movement. As a result of the specific configuration of the arms 108 and 110, proximate their portions 128 and 130, movement of the cylindrical block portion 106 toward the front of the housing 86 permits a clockwise rotation of arm 108 about its pivot 112, and a counterclockwise rotation of arm 110 about its pivot 114. Conversely, a linear movement of the cylindrical block 106 toward the rear of the housing 86 (toward the dial 100), results in a counterclockwise rotation of arm 108 about its pivot and a clockwise rotation of arm 110 about its pivot, due to the engagement between block 106 and portions 128 and 130 of the two arms 108 and 110. This engagement may be best seen by referring to FIG. 3. Consequently, in order to clamp a piece of tubing between the two arms, 108 and 110, at their pipe engaging portions 120 and 122, respectively, the dial 100 is rotated in a clockwise manner (as viewed from the rear), and the cylindrical block member 106 is moved rearwardly in a linear manner, such that it moves along the inner portions of arms 128 and 130 to pivot the tube engaging portions 120 and 122 of the two arms into engagement with the two.

A "V", generally indicated at 146, formed at the very front of the housing 86, provides for a centering of the tubing relative to the housing and to the two arms 108 and 100. Additionally, it should be noted that the "V" or notch 146 is formed of two portions, 148 and 150, which are substantially diametrically opposed to the tube engaging portion 122 and the tube engaging portion 120, respectively, of the two arms. In this manner, the forces upon the tube being clamped are equalized and the clamping device may be easily aligned, such that the longitudinal axis of the shaft 98, and of the drill 152 of the drilling device 82, will be radially centered with respect to the center of the tubing being cut.

In practice, the self-aligning clamping device 80 and the drilling mechanism 82 with which it is operationally associated, are positioned on a piece of tubing in a manner indicated in FIG. 5. The dial 100 is turned in a clockwise direction (assuming a right-hand thread to the threaded portion 102 of the shaft 98), so as to move the cylindrical block member 106 rearwardly, thereby pivoting arm 108 counterclockwise and arm 110 clockwise into engagement with the tube 48. The dial 100 is turned until engagement is made and tightened to a point which will secure both the clamp and drilling device to the tubing. Subsequently, the drilling device 82 is actuated and the drill 152 is moved into engagement with the tube 48 through a drill feed handle 154 connected to the drilling device 82. Once the hole has been cut and centered on the intersection between the new tube 48 and the old tube 26, the drill 152 is removed from the hole and the clamping device is removed from the tubing 48 and repositioned so it may conveniently drill a hole at the lower intersection between the new tubing 48 and the old tubing 26.

The clamping device associated with the present invention is employed to both support a drilling mechanism and operationally locate the drill per se, such that the hole being cut into the tubing is radially oriented with respect to the center of the tubing being cut. This self-aligning and centering function of the clamping device 80 is provided through the simultaneous movement of the two arms 108 and 110 by a common actuating mechanism 106. Additionally, the V-shaped groove 146 formed at the front of the housing 86 functions, in combination with the tube engaging portions 120 and 122 of the two arms 108 and 110, to position the tubing being cut relative to the clamping device such that center of the tubing will lie on a longitudinal axis 156, passing through the center of the shaft 98 and of the clamping device 80 in general. As a result, the drill 152 is prevented from "wandering" about the surface of the tubing being cut at the initial stages of the cut. Moreover, due to the specific manner in which the tubing is clamped, the plug 70, described previously, may be easily cut using the same clamping device and a slightly larger plug-cutting drill head than that shown at 152.

Both the method and the apparatus employed in the method of the present invention simplify the procedure involved in the repair of the water-filled cooling tubes to a gas hood for a BOP furnace. With the ability to drill round holes accurately in round tubing, the time spent in accurately squaring off rectangular holes in the tubing and fitting a rectangular window to that rectangular hole is done away with. Obviously, this will lead to decreased downtime, labor costs and an increase in the general efficiency of repair procedures for cooling tubes. It should become apparent, however, that the greatest advantage to be realized is the greatly reduced downtime necessary for affecting these repairs. This result has an indirect relationship to the safety of the employee affecting the repairs, as well as to the gas hood to which the repairs are being made.

While certain changes may be made in the above-noted method and apparatus, without departing from the scope of the invention herein involved, it is intended that all matter contained in the above description, or shown in the accompanying drawings, shall be interpreted as illustrated and not in a limiting sense.

I claim:

1. A method of repairing cooling tubes contained within a gas hood for a steelmaking vessel, said method comprising:
   cutting out the portion of tube which has been identified as in need of repair;
   squaring off the two ends of the tubing between which
   cutting a length of replacement tubing to fit the space between the two ends;
   inserting the replacement tubing in place between the two ends;
   temporarily securing the replacement tubing in place;

radially drilling a circular hole proximate each end of the replacement tubing;

permanently securing, in a water-tight relationship, the replacement tube at each end to the two ends of existing tubing;

placing an equally-sized plug cut from circular tubing into the circular hole cut proximate each end of the replacement tubing; and sealing the plugs to the holes cut in the tubing to form a water-tight relationship between the two.

2. The method in accordance with claim 1 wherein said method further includes the step of isolating the portion of tube which has been identified as in need of repair from adjacent tubes.

3. The method in accordance with claim 1 wherein the temporary securing of the replacement tube in place is done by tack welding the replacement tube to the two ends at points which will not substantially interfere with the next step of drilling.

4. The method in accordance with claim 1 wherein the radial drilling of the circular hole is done so that the center of the hole is at the intersection of the existing tube and the replacement tube at both ends of the replacement tube.

5. The method in accordance with claim 1 wherein the permanent securing of the replacement tube to each end of the two ends of existing tubing is done by welding.

6. The method in accordance with claim 5 wherein the welding of the replacement tube at the two ends of the existing tubing is done on the inside of the tubing through the circular hole drilled proximate each end of the replacement tubing.

7. The method in accordance with claim 1 wherein the radial drilling of the circular hole proximate each end of the replacement tube is done such that the center of the hole is at the intersection of the existing tube and the replacement tube at both ends, the permanent securing of the replacement tube to each end of the two ends of existing tubing being done by welding the inside of the two ends together through the conveniently located hole at the intersection of the replacement tube and the existing tube.

8. The method in accordance with claim 1 wherein said step of sealing the plugs to the holes cut in the tubing to form a water-tight relationship between the two is done by welding.

9. The method in accordance with claim 8 wherein the method further includes the step of beveling the outside circumference of the plug so as to provide an adequate chamfer for the weld between the plug and the tubing adjacent thereto.

10. The method in accordance with claim 8 wherein the method further includes the step of beveling the circumference of the hole drilled with the tubing on the outside of the tubing so as to provide for an adequate chamfer for the weld between the plug and the tubing adjacent thereto.

11. The method in accordance with claim 8 wherein the step of selectively beveling the outside circumference of the plug and selectively beveling the circumference of the hole drilled in the tubing on the outside of the tubing at combined places about the adjacent portions therebetween so as to provide, in total, an adequate chamfer for the weld between the plug and the tubing adjacent thereto.

* * * * *

UNITED STATES PATENT OFFICE
CERTIFICATE OF CORRECTION

Patent No. 4,047,659          Dated September 13, 1977

Inventor(s) Drago M. Vucic

It is certified that error appears in the above-identified patent and that said Letters Patent are hereby corrected as shown below:

In the ABSTRACT, change "ABSTRACT" to -- ABSTRACT OF THE

DISCLOSURE --.

Column 2, line 11, change "particularly" to -- particularity --.
                   claim 1,
Column 8, line 63,/after "which", insert -- the tubing has been removed; --.

Signed and Sealed this

Twenty-fourth Day of April 1979

[SEAL]

Attest:

RUTH C. MASON
Attesting Officer

DONALD W. BANNER
Commissioner of Patents and Trademarks